US010731466B2

(12) United States Patent
Mochi et al.

(10) Patent No.: US 10,731,466 B2
(45) Date of Patent: Aug. 4, 2020

(54) BALANCING DEVICE FOR A ROTOR INCLUDING MULTIDIRECTIONAL BALANCING TOOLS

(71) Applicant: Nuovo Pignone Tecnologie Srl, Florence (IT)

(72) Inventors: Gianni Mochi, Florence (IT); Giacomo Braglia, Florence (IT)

(73) Assignee: NUOVO PIGNONE TECHNOLOGIE SRL, Florence (IT)

( * ) Notice: Subject to any disclaimer, the term of this patent is extended or adjusted under 35 U.S.C. 154(b) by 0 days.

(21) Appl. No.: 15/780,240

(22) PCT Filed: Dec. 1, 2016

(86) PCT No.: PCT/EP2016/079421
§ 371 (c)(1),
(2) Date: May 31, 2018

(87) PCT Pub. No.: WO2017/093395
PCT Pub. Date: Jun. 8, 2017

(65) Prior Publication Data
US 2018/0347365 A1    Dec. 6, 2018

Related U.S. Application Data

(60) Provisional application No. PCT/EP2016/079421, filed on Dec. 1, 2016.

(30) Foreign Application Priority Data

Dec. 2, 2015   (IT) ..................... 102015000079170

(51) Int. Cl.
*G01M 1/22*   (2006.01)
*F01D 5/02*   (2006.01)
(Continued)

(52) U.S. Cl.
CPC ........... *F01D 5/027* (2013.01); *F04D 29/662* (2013.01); *F16F 15/322* (2013.01); *F16F 15/36* (2013.01);
(Continued)

(58) Field of Classification Search
CPC ........ F01D 5/027; F04D 29/662; G01M 1/22; G01M 1/32; G01M 1/36; G01M 1/02;
(Continued)

(56) References Cited

U.S. PATENT DOCUMENTS

| 4,530,239 | A |   | 7/1985 | Scarinci |           |
| 5,099,430 | A | * | 3/1992 | Hirsch   | F16F 15/31 |
|           |   |   |        |          | 464/180   |

(Continued)

FOREIGN PATENT DOCUMENTS

| EP | 1 602 855 A2  | 12/2005 |
| FR | 3 005 095 A1  | 10/2014 |
| WO | 90/04768 A1   |  5/1990 |

OTHER PUBLICATIONS

Italian Search Report and Written Opinion issued in connection with corresponding IT Application No. 102015000079170 dated Aug. 26, 2016.

(Continued)

*Primary Examiner* — Harshad R Patel
*Assistant Examiner* — Nigel H Plumb
(74) *Attorney, Agent, or Firm* — Baker Hughes Patent Org.

(57) ABSTRACT

A device for balancing a turbomachine rotor having a driver rotor and a driven rotor is provided. The device comprises a base that is coaxially fixable to the turbomachine rotor and configured to transfer torque from the driver rotor to the driven rotor. The device also comprises at least three balancing tools arranged on the base, each balancing tool (i)

(Continued)

defining a respective balancing direction along a radial direction of the base and (ii) comprising: a weight moveable along the respective balancing direction, and a motor configured to move the weight along the respective balancing direction to balance the rotor.

13 Claims, 6 Drawing Sheets

(51) Int. Cl.
  *F04D 29/66* (2006.01)
  *G01M 1/32* (2006.01)
  *F16F 15/36* (2006.01)
  *F16F 15/32* (2006.01)

(52) U.S. Cl.
  CPC ............... *G01M 1/22* (2013.01); *G01M 1/32* (2013.01); *F05D 2260/15* (2013.01); *F16F 15/32* (2013.01)

(58) Field of Classification Search
  CPC .......... G01M 1/225; G01M 1/28; G01M 1/30; G01M 1/12; G01M 1/14; G01M 1/20; G01M 1/00; F05D 2260/15; F16F 15/32; B64C 11/008; G01C 19/04; G01L 5/0066; G01L 5/0076; G01L 25/00; G01N 29/30
  See application file for complete search history.

(56) References Cited

U.S. PATENT DOCUMENTS

2005/0265846 A1* 12/2005 Przytulski ............... F01D 5/027
  416/144
2006/0005623 A1 1/2006 Hildebrand et al.

OTHER PUBLICATIONS

International Search Report and Written Opinion issued in connection with corresponding PCT Application No. PCT/EP2016/079421 dated Feb. 17, 2017.

International Preliminary Report on Patentability issued in connection with corresponding PCT Application No. PCT/EP2016/079421 dated Jun. 5, 2018.

* cited by examiner

BALANCING DEVICE FOR A ROTOR INCLUDING MULTIDIRECTIONAL BALANCING TOOLS

BACKGROUND OF THE INVENTION

The subject matter of the present disclosure relates to a device for balancing a rotor of a turbomachine. Such device can be employed in the turbomachines of all field including, but not limited to, power generation and the oil and gas extraction industry.

As it is commonly known, unbalance is the most common cause of excessive vibration in high-speed turbomachinery. High vibration can cause bearing, seal, and rotor damage, support system damage, increased noise, and other unwanted effects.

With more detail, an unbalance condition exists when the mass centerline does not coincide with the rotating centerline. In other words, if there were a heavy spot at one place on a disc, the mass centerline would be slightly displaced from the rotating centerline.

To control vibration, rotors are dynamically balanced. Although there are many balance standards, there is no practical method to relate vibration and balance. Flexible rotors present additional challenges.

Also, if a rotor is made from several components, like an impeller mounted on a shaft, the assembly process might produce changes in geometry that could cause an unbalance. It is typically recommended that each part of the rotor, including the shaft, be component balanced before assembling the rotor.

Normally, the rotor is balanced and installed on the turbomachine. To do this, weights are installed in appropriate places in order to bring the center of mass to coincide with the axis of rotation.

BRIEF DESCRIPTION OF THE INVENTION

After the balancing procedure is performed during assembly, the configuration of the weights cannot be changed while the turbomachine is assembled and operating. To add, remove or change weights it is therefore necessary to stop the rotor, disassemble it at least in part and repeat most of the balancing procedure.

A first embodiment of the invention therefore relates to a device for balancing a rotor of a turbomachine. Such device comprises a base coaxially fixable to a rotor of a turbomachine.

At least three balancing tools are arranged on the base. Each balancing tool defines a respective balancing direction along a radial direction of the base.

Each balancing tool comprises a weight which is moveable along the balancing direction. The balancing directions of the balancing tools are uniformly angularly spaced.

A second embodiment of the invention relates to a turbomachine. The turbomachine comprises a rotor and a device for balancing the rotor as in the first embodiment. The device is attached to the rotor.

A sensor is configured to measure a disequilibrium vector of the rotor during its rotation. A control unit is configured for adjusting the device as a function of the disequilibrium vector.

A third embodiment of the invention relates to a method for balancing a rotor.

The method comprises the step of providing a device for balancing the rotor as in the first embodiment. The device is connected to the rotor of a turbomachine.

The device and the rotor are rotated about a common axis. One or more of the weights of the device are moved along their respective balancing directions in order to change the center of gravity of the rotor.

Other advantageous embodiments are set forth in the appended claims. The embodiments of the invention allow to dynamically balance the rotor, without needing to deactivate the turbomachine. In other words, it is possible to perform the balancing with the turbomachine completely on line.

BRIEF DESCRIPTION OF THE DRAWINGS

Further details and specific embodiments will refer to the attached drawings, in which.

DETAILED DESCRIPTION

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment.

Further, the particular features, structures or characteristics may be combined in any suitable manner in one or more embodiments.

With reference to the attached drawings, with the number 1 is indicated a device for balancing a rotor 2 of a turbomachine. In particular, the rotor 2 comprises a driver rotor 2A and a driven rotor 2B attached to the driver rotor 2A. The rotor 2 also has a rotation axis "A".

Figure 1:
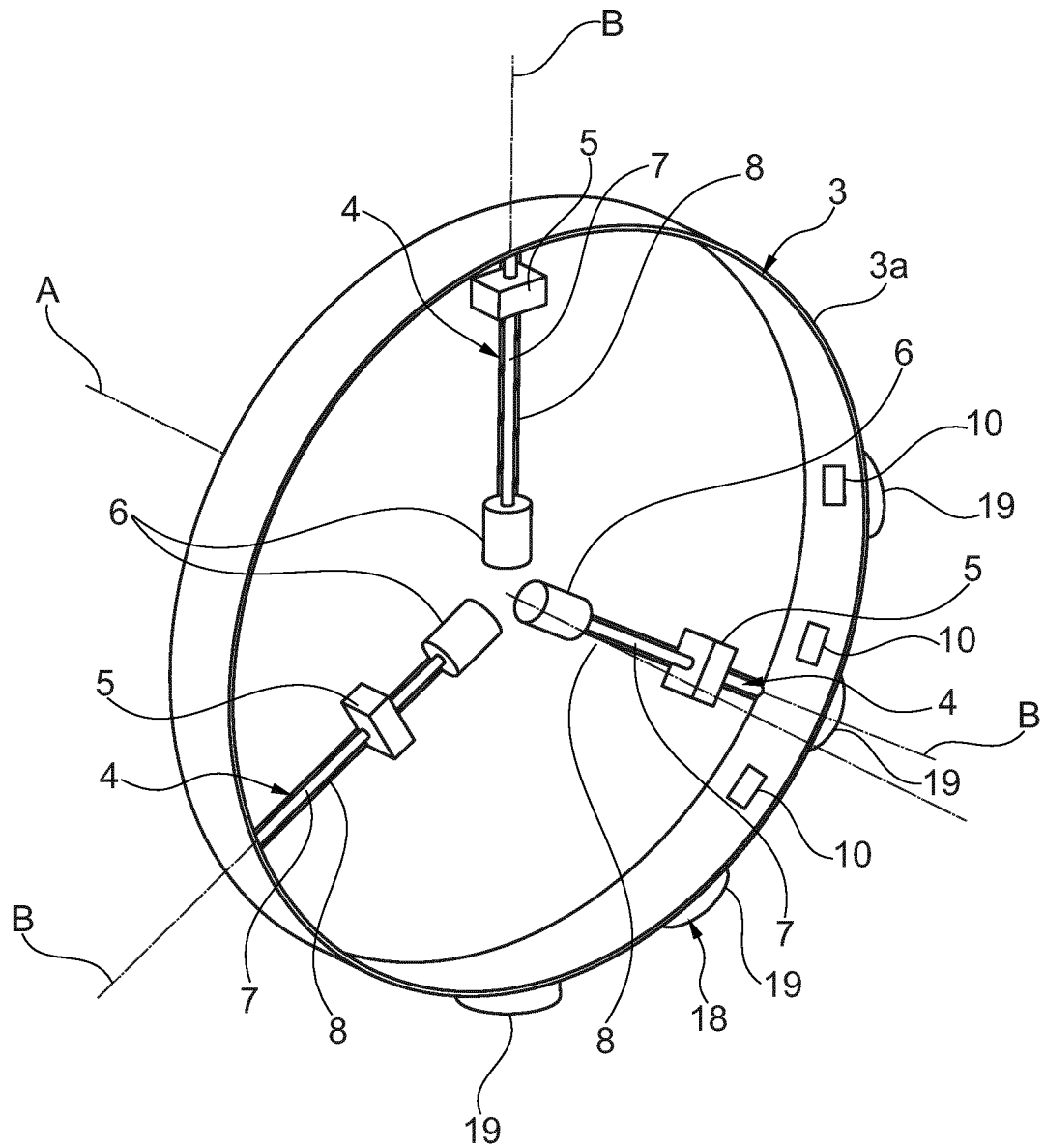
FIG. 1 is a perspective view of a device for balancing a rotor of a turbomachine according to an embodiment of the present invention.
Figure 1A:
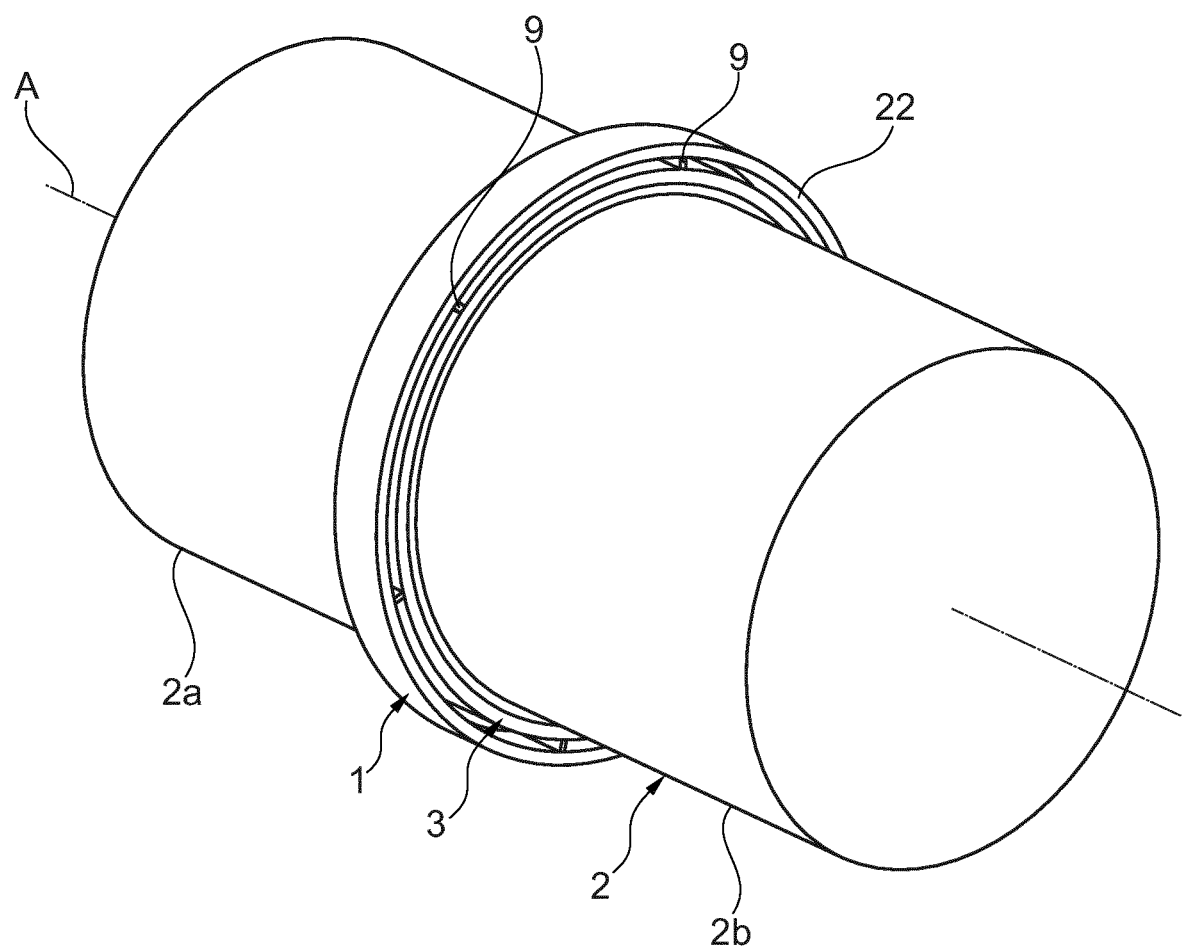
FIG. 1A is a perspective view of the device of FIG. 1 installed on a shaft of a turbomachine.
Figure 2:
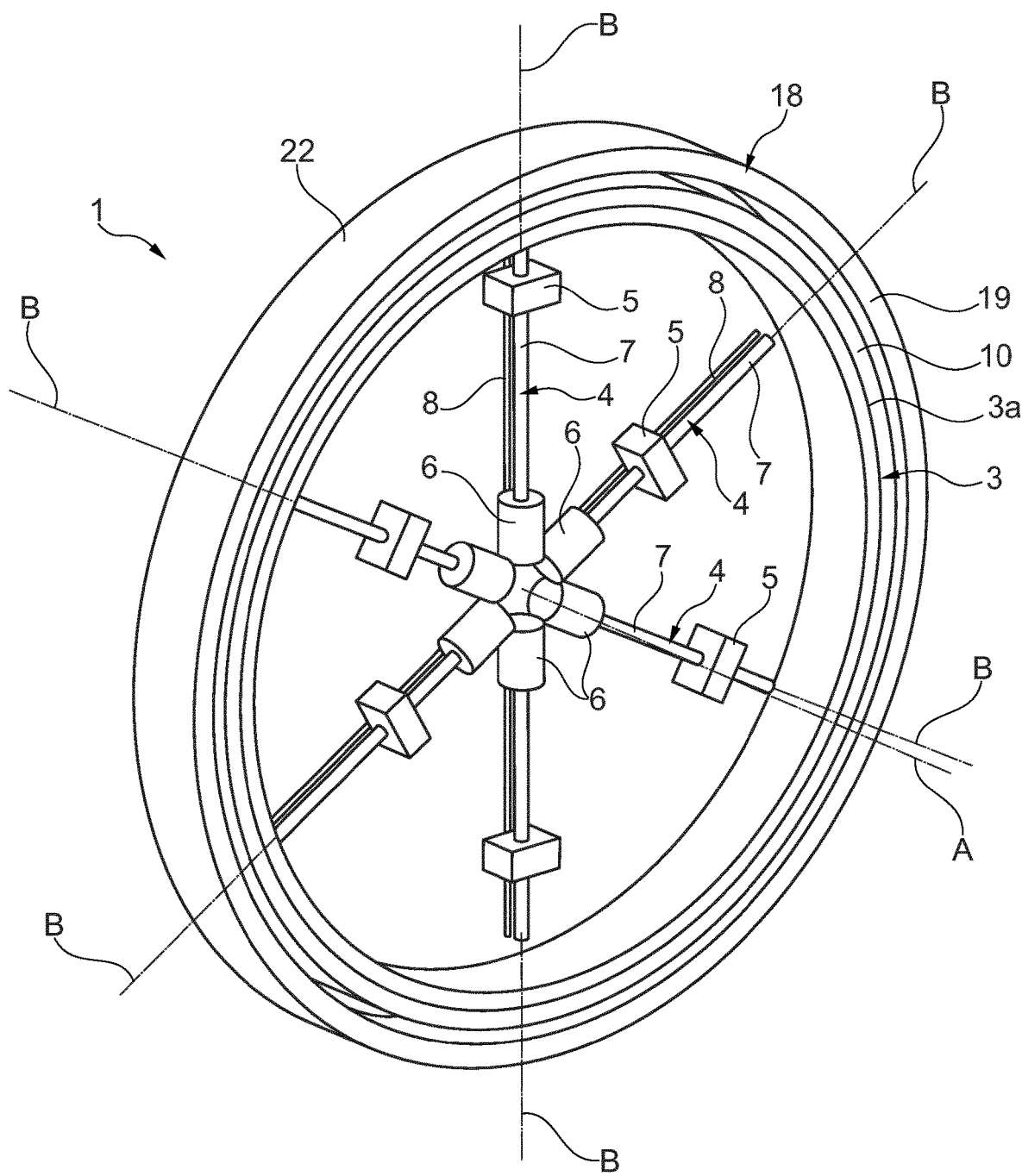
FIG. 2 is a perspective view of a device for balancing a rotor of a turbomachine according to a second embodiment of the present invention.

Indeed, the device 1 comprises a base 3 that is coaxially fixable to the rotor 2. The base 3 is attachable to the rotor 2 in such a way that its central axis coincides with the rotation axis "A" of the turbomachine itself. In particular, as shown in FIG. 1A, the base 3 is attached between the driver 2A and the driven rotor 2B. Therefore, the task of transferring power and/or torque from the driver 2A to the driven rotor 2B of the turbomachine is performed by the base 3.

The base 3 is shaped as a circular dish, and is able to support the other component of the device 1 as explained below. A statoric element 22, shaped as a ring, surrounds the base 3. The statoric element 22 is attached to a fixed part of the machine such as, for example, a shroud of the rotor or the casing itself. Therefore, the base 3 has a rim 3A which, when installed, faces the statoric element 22. More details on the statoric element 22 will be given in a following part of the present disclosure.

Indeed, the device 1 comprises at least three balancing tools 4, which are arranged on the base 3. These balancing tools 4 have the function of providing a way to move the center of mass of the rotor 2 of the turbomachine whenever it gets displaced. With more detail, each balancing tool 4 defines a respective balancing direction "B" along a radial direction of the base 3.

With additional detail, each balancing tool 4 comprises a weight 5 which is moveable along the balancing direction "B". The balancing tools 4 are arranged so that the balancing directions "B" are uniformly angularly spaced. More generally, it is only necessary that the balancing directions "B" are arranged so that they can move the center of mass of the device 1 on any point of the base 3, so that any possible offset of the center of mass of the rotor 2 can be corrected. This requires at minimum three balancing tools 4, each with its respective balancing direction "B" arranged transversally with respect to the other two, without actually being angularly equally spaced. If four balancing tools 4 are used, the most efficient arranging pattern is that of a cross, with each balancing direction "B" being distanced from the two adjacent balancing direction "B" by a 90° angle. it is to be noted that, the more balancing tools 4 are employed, the lighter each single weight 5 can be while still being able to achieve the same technical effect, namely the balancing of the rotor 2.

In the preferred embodiments of the invention, all of the weights 5 of the balancing tools 4 are equal. Namely, each of the balancing tool 4 has the same effect on the center of mass of the assembly comprising the device 1 and the rotor 2. In an embodiment, the mass of the weight 5 is function of the 10 mass of the rotor 2. In detail a minimum value of the mass of the weight 5 is about 0.0014% of the total mass of the rotor 2.

With additional detail, each balancing tool 4 comprises a motor 6, fixedly installed with respect to the base 3, which is configured to move the weight 5 along the balancing direction "B". The motor 6 is an electric motor. In this way, the distribution of mass of the device 1 can be changed by acting on the motors 6 of some or all of the balancing tools 4. Indeed, each balancing tool 4 comprises a worm gear 7, which is in particular driven by the motor 6. The weight 5 is slidingly connected to the worm gear

7. Also, the weight is slidingly connected to the base 3, so that the weight 5 slides with respect to the base 3 when the worm gear 7 is rotated. With additional detail, the balancing tool can comprise a rail 8, fixed to the base 3, which allows the weight 5 to slide. Each balancing tool 4 is provided with a position detector 17 so that the position of the weight 5 on the balancing direction "B" can be known. Such position detector 17 can therefore be a counter associated with each motor 6. Indeed, by knowing the number of revolutions of the motor 6 and the dimensional parameters of the associated worm gear 7, it is possible to compute the position of the weight 5 on the worm gear 7.

It is to be noted that the thread 7A of the worm gear 7 has a trapezoidal section.

Figure 4:
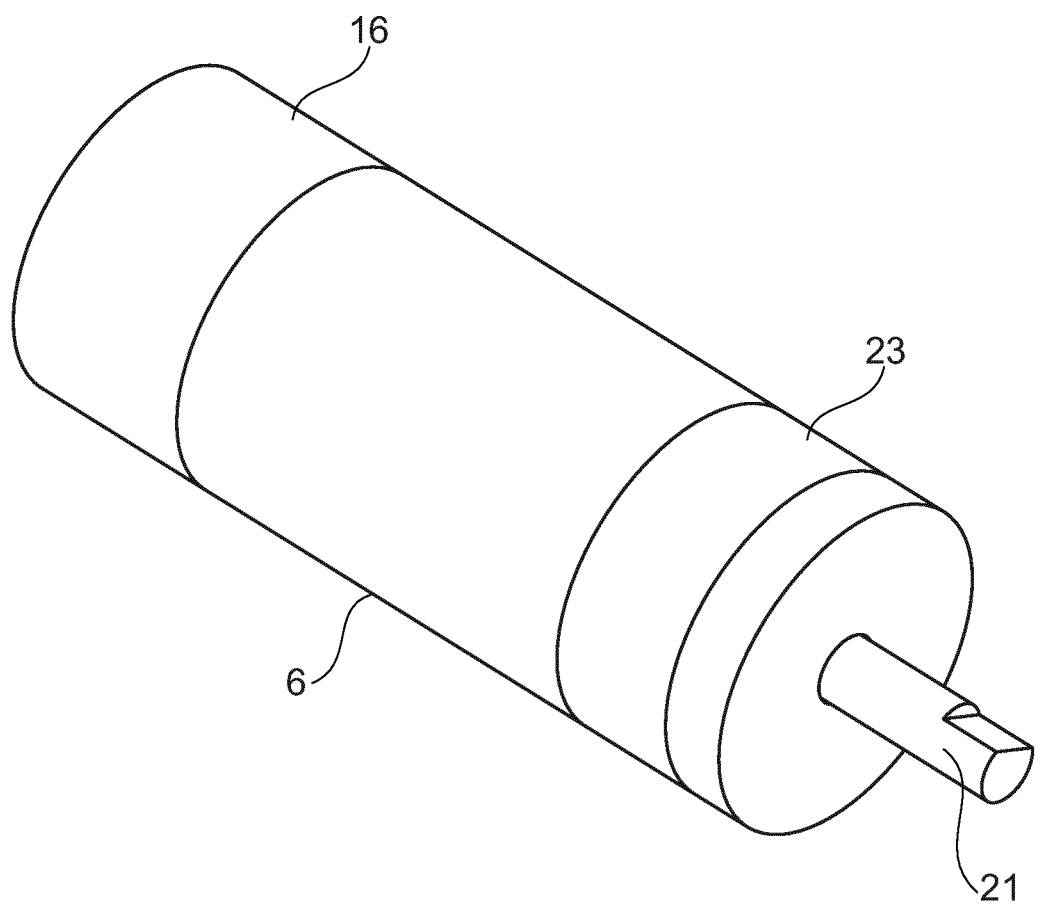
FIG. 4 is a schematic perspective view of a component of the device according to the embodiments from FIGS. 1-3.
Figure 5:
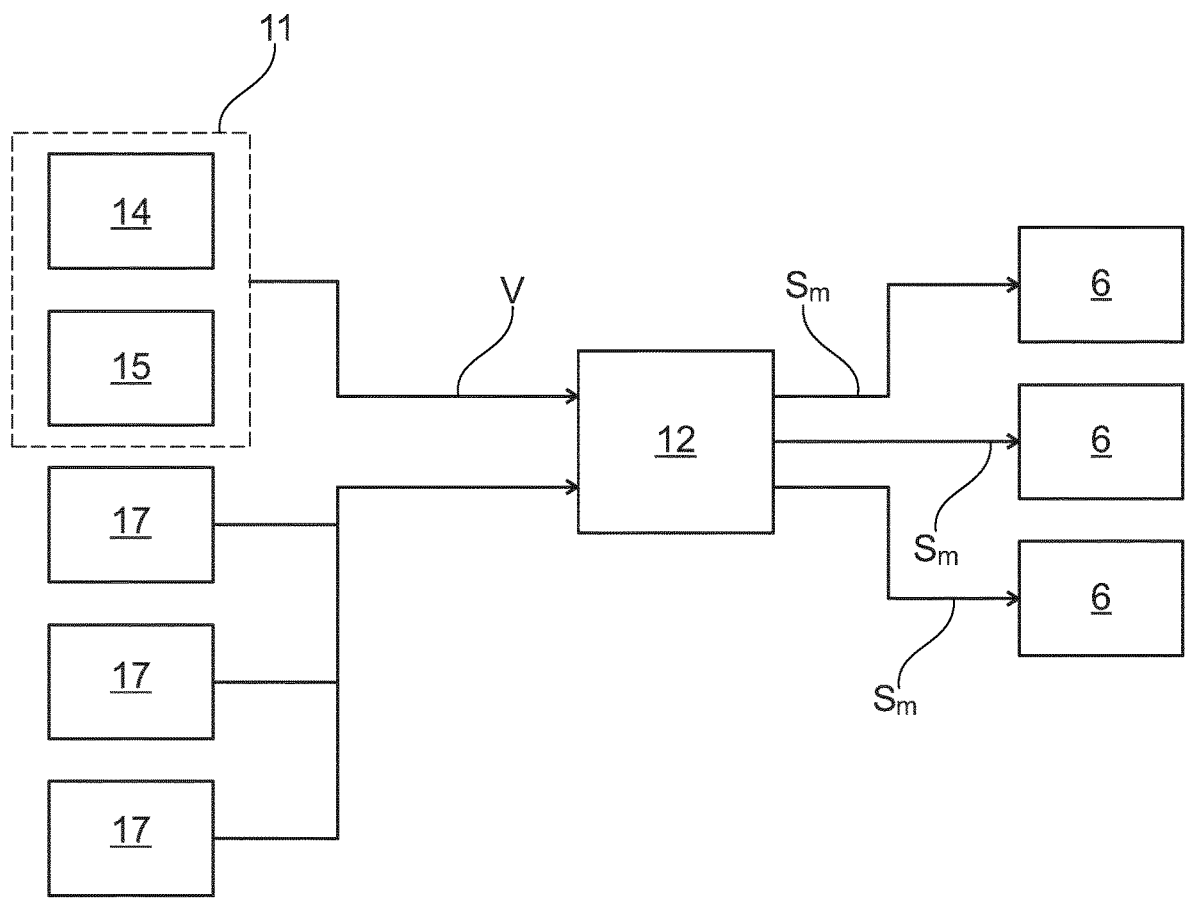
FIG. 5 is a schematic representation of the functioning of the device from FIG. 1.

Each motor 6 assembly, such as the one shown on FIG. 4, comprises the motor 6 itself and a rotor 21, which is attached to the respective worm gear 7. A blocking device 16 is installed behind the motor 6, on the side opposite to the worm gear 7. Such blocking device 16 is configured to block the motor 6 if electricity is not provided. Indeed, the blocking device is configured to act on the worm gear 7 in order to prevent it from sliding. With additional detail, the blocking device 16 may comprises a clutch brake (not shown in the drawings). The clutch brake acts on the rotor 21 of the motor 6. Since the above mentioned worm gear 7 is connected to the rotor 20 of the motor 6, blocking the rotor 20 also blocks the worm gear 7, thus ensuring that the corresponding weight 5 stays in place. It is to be noted that the worm gear 7 itself may be designed in such a way that, when the motor 6 is not enabled, the friction between the weight 5 and the worm gear 7 is sufficient to keep the weight 5 stably in place, thus avoiding the need for the blocking device 16. Nevertheless, the blocking device 16 may still be included in this case to provide a redundant safety feature.

Figure 3:
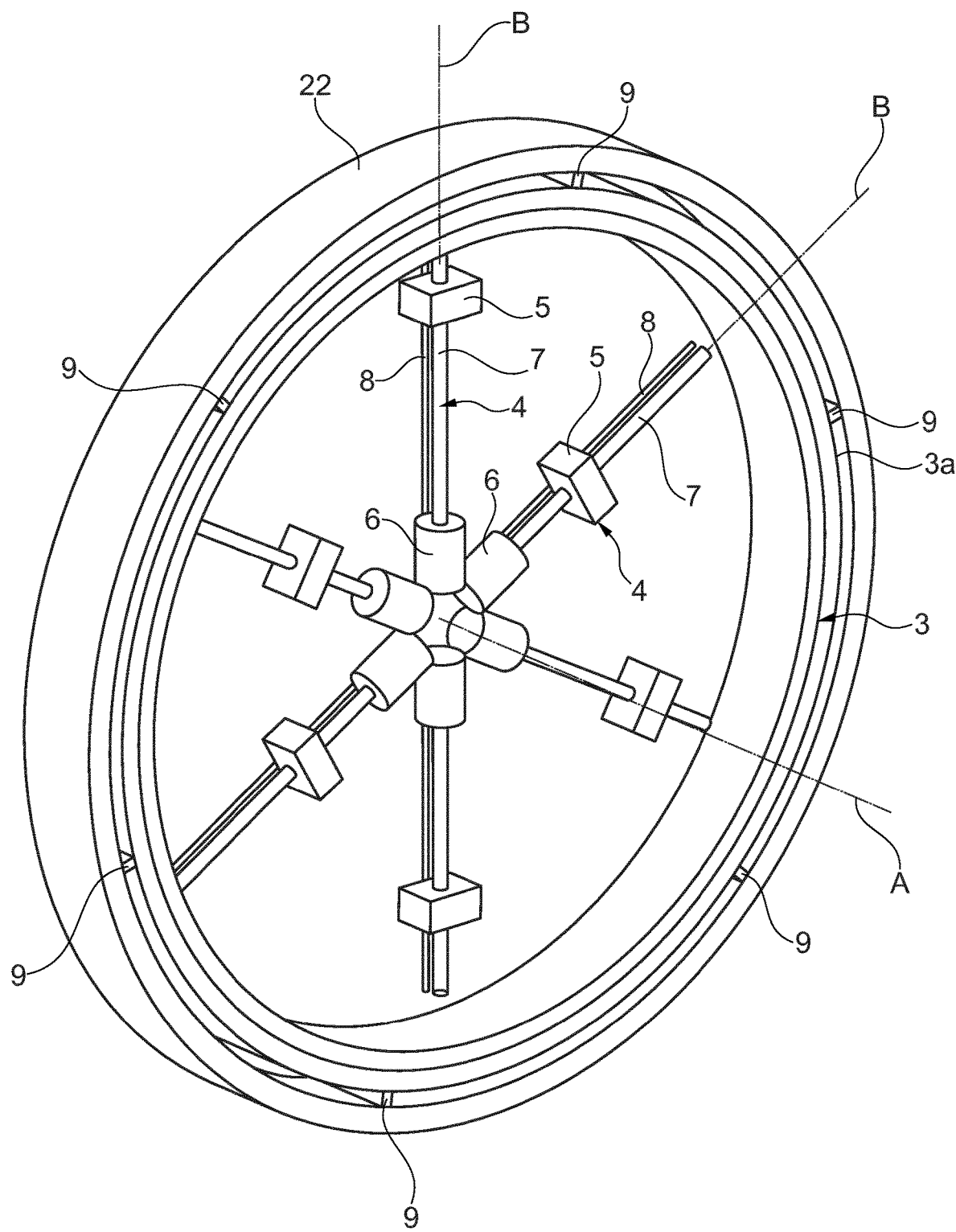
FIG. 3 is a perspective view of a device for balancing a rotor of a turbomachine according to a third embodiment of the present invention.

To provide power to the motors 6, the device 1 further comprises sliding contacts 9 for electrically connecting an electric source to the motors 6. The sliding contacts 9 can be placed anywhere on the base 3. However, a particularly advantageous position is the rim 3A of the base 3, as shown for example in FIG. 3. In this case, the sliding contacts 9 slide on the statoric element 22, thus the statoric element 22 will be part of the power supply system of the device 1. The sliding contacts 9 are themselves known, and will not be further described in detail.

Alternatively, the device 1 comprises a contactless power supply 18 of the inductive type, for electrically connecting an electric source to the motors 6. In this case, the device 1 comprises inductive plates 10 in place of the abovementioned sliding contacts 9. Therefore, the inductive plates 10 are installed on the base 3, on the rim 3A so that they can interact with corresponding inductive plates 19 fixed on the statoric element 22.

Also an embodiment of the invention relates to a turbomachine which comprises the rotor 2 and a device 1 as the one described above. It is to be noted that the device 1 can be connected to an end of the rotor 2.

Also, at least a sensor 11 is provided, which is configured to measure a disequilibrium vector "V" of the rotor 2 during its rotation. The sensor 11 is then configured to emit a signal representing such disequilibrium vector "V".

The disequilibrium vector "V" is then sent to a control unit 12, which is configured for adjusting the device 1 as a function of the disequilibrium vector "V". The control unit 12 may be the standard control unit of a turbine which is additionally equipped with a software for dealing with the disequilibrium vector "V" and the device 1. Alternatively, the control unit 12 may be an additional hardware provided to control just the device 1. It is also to be noted that a practical embodiment of the sensor 11 is a set of vibration detection devices 14 which send their output to the control unit 12. A part of the hardware which implements the control unit 12 may therefore be dedicated to computing the disequilibrium vector "V".

With additional detail, the vibration detection device 14 can comprise one or more piezoelectric sensors 14, which are configured to measure the components of vibrations according to orthogonal axes. The turbomachine comprises a keyphasor 15, which has the function of measuring the speed of the rotation of the rotor 2. The signal from the keyphasor 15 is also sent to the control unit 12. The control unit 12 can therefore use the signal from the keyphasor 15 to compute the above mentioned disequilibrium vector "V" in the rotating frame of reference of the rotor 2.

Also, it is to be noted that the control unit 12 can also acquire the position of the weights 5 through the above mentioned position detectors 17

The control unit 12 is then connected to the balancing tools 4, in particular to the motors 6. Therefore the control unit 12 can emit a control signal "Sm" for each of the motors 6, in order to move the corresponding weights 5. And thus rebalance the motors 2.

In an alternative embodiment, the turbomachine may not be provided with a control unit 12 such as the one described above. In this case, the position of the weights 5 of the balancing tools 4 can be adjusted manually by an operator in order to rebalance the rotor 2, whenever it is necessary to do so. It is also an embodiment of the invention a method for balancing the above described rotor 2. The method comprises the step of providing a device 1 for balancing the rotor 2 such as the one described above. The device 1 is then assembled on the rotor 2. When the turbomachine is operating, the device 1 and the rotor 2 therefore rotate on a common rotation axis "A".

If an unbalance is detected, in particular through the above described sensor 11, the disequilibrium vector "V" is computed and then provided to the control unit 12. The control unit 12 then moves the weights 5 along the balancing directions "B", in order to change the center of gravity of the rotor 2. This is done as a function of the disequilibrium vector "V".

With additional detail, the control unit 12 acquires the current position of the weights 5 by checking the position detectors 17, then moves one or more weights 5 by acting on the corresponding motor 6.

The invention claimed is:

1. A device for balancing a turbomachine rotor comprising a driver rotor and a driven rotor, the device comprising:
   a base coaxially fixable to the turbomachine rotor and configured to transfer torque from the driver rotor to the driven rotor; and
   at least three balancing tools arranged on the base, each balancing tool (i) defining a respective balancing direction along a radial direction of the base and (ii) comprising:
     a weight moveable along the respective balancing direction,
     a motor configured to move the weight along the respective balancing direction, and
     a worm gear driven by the motor, the weight being slidingly connected to the worm gear and the base so that the worm gear slides with respect to the base when the worm gear is rotated,
   wherein the balancing directions of the at least three balancing tools are uniformly angularly spaced relative to each other.

2. The device according to claim 1, wherein the weights are equal.

3. The device according to claim 1, wherein the thread of the worm gear has trapezoidal section.

4. The device according to claim 1, wherein the motor is an electric motor.

5. The device according to claim 1, wherein the weight of each balancing tool can move radially from and to a position close to a rotation axis of the device along the balancing direction.

6. A turbomachine comprising:
   a rotor comprising a driver rotor and a driven rotor;
   a device for balancing the rotor according to claim 1 connected to said rotor;
   at least a sensor configured to measure a disequilibrium vector of the rotor during its rotation; and
   a control unit configured for adjusting the device as a function of the disequilibrium vector.

7. The turbomachine according to claim 6, wherein the device for balancing the rotor is connected between the driver rotor and the driven rotor.

8. A device for balancing a turbomachine rotor comprising a driver rotor and a driven rotor, the device comprising:
   a base coaxially fixable to the turbomachine rotor and configured to transfer torque from the driver rotor to the driven rotor; and
   at least three balancing tools arranged on the base, each balancing tool (i) defining a respective balancing direction along a radial direction of the base and (ii) comprising:
     a weight moveable along the respective balancing direction, and
     a motor configured to move the weight along the respective balancing direction; and
   sliding contacts for electrically connecting an electric source to the motor of each balancing tool,
   wherein the balancing directions of the at least three balancing tools are uniformly angularly spaced relative to each other.

9. A device for balancing a turbomachine rotor comprising a driver rotor and a driven rotor, the device comprising:
   a base coaxially fixable to the turbomachine rotor and configured to transfer torque from the driver rotor to the driven rotor; and
   at least three balancing tools arranged on the base, each balancing tool (i) defining a respective balancing direction along a radial direction of the base and (ii) comprising:
     a weight moveable along the respective balancing direction, and
     a motor configured to move the weight along the respective balancing direction; and
   a contactless power supply for electrically connecting an electric source to the motor of each balancing tool,
   wherein the balancing directions of the at least three balancing tools are uniformly angularly spaced relative to each other.

10. The device according to claim 9 wherein the contactless power supply is of the inductive type.

11. A device for balancing a turbomachine rotor comprising a driver rotor and a driven rotor, the device comprising:
    a base coaxially fixable to the turbomachine rotor and configured to transfer torque from the driver rotor to the driven rotor; and
    at least three balancing tools arranged on the base, each balancing tool (i) defining a respective balancing direction along a radial direction of the base and (ii) comprising:
      a weight moveable along the respective balancing direction, and
      a motor configured to move the weight along the respective balancing direction,
    wherein the motor comprises a blocking device configured to block the motor if electricity is not provided to ensure the weight stays in place, and the balancing directions of the at least three balancing tools are uniformly angularly spaced relative to each other.

12. A turbomachine comprising:
    a rotor comprising a driver rotor and a driven rotor;
    a device for balancing the rotor, the device comprising:

a base coaxially fixable to the turbomachine rotor and configured to transfer torque from the driver rotor to the driven rotor, and at least three balancing tools arranged on the base, each balancing tool (i) defining a respective balancing direction along a radial direction of the base and (ii) comprising:

a weight moveable along the respective balancing direction, and a motor configured to move the weight along the respective balancing direction;

at least a sensor configured to measure a disequilibrium vector of the rotor during its rotation, the at least a sensor comprising a set of vibration detection devices configured to measure components of vibrations according to orthogonal axes;

a control unit configured for adjusting the device as a function of the disequilibrium vector; and a keyphasor, wherein the balancing directions of the at least three balancing tools are uniformly angularly spaced relative to each other.

13. The turbomachine of claim 12 wherein the sensor is one or more piezoelectric sensor.

* * * * *